(12) United States Patent
Einav et al.

(10) Patent No.: US 8,511,586 B2
(45) Date of Patent: Aug. 20, 2013

(54) DISC SHAPED REGULATED DRIP IRRIGATION EMITTER

(75) Inventors: Zvika Einav, Kibbutz Gvaj (IL); Jonathan D. Hart, Oceanside, CA (US)

(73) Assignee: Deere & Company, Moline, IL (US)

( * ) Notice: Subject to any disclaimer, the term of this patent is extended or adjusted under 35 U.S.C. 154(b) by 189 days.

(21) Appl. No.: 13/090,700

(22) Filed: Apr. 20, 2011

(65) Prior Publication Data

US 2012/0267454 A1    Oct. 25, 2012

(51) Int. Cl.
B05B 15/00    (2006.01)
(52) U.S. Cl.
USPC .............. 239/542; 239/533.1; 239/533.13; 239/547; 239/570; 138/42
(58) Field of Classification Search
USPC ............... 239/533.1, 533.13, 542, 547, 570, 239/571; 138/42
See application file for complete search history.

(56) References Cited

U.S. PATENT DOCUMENTS

| | | | |
|---|---|---|---|
| 4,210,287 A | 7/1980 | Mehoudar | |
| 4,718,608 A | 1/1988 | Mehoudar | |
| 4,735,363 A | 4/1988 | Shfaram et al. | |
| 4,796,660 A | 1/1989 | Bron | |
| 4,850,531 A | 7/1989 | Littleton | |
| 5,111,996 A | 5/1992 | Eckstein | |
| 5,123,984 A | 6/1992 | Allport et al. | |
| 5,163,622 A | 11/1992 | Cohen | |
| 5,183,208 A | 2/1993 | Cohen | |
| 5,200,132 A | 4/1993 | Shfaram et al. | |
| 5,203,503 A | 4/1993 | Cohen | |
| 5,207,386 A | 5/1993 | Mehoudar | |
| 5,282,916 A | 2/1994 | Bloom | |
| 5,294,058 A | 3/1994 | Einav | |
| 5,400,973 A * | 3/1995 | Cohen | 239/533.1 |
| 5,584,952 A | 12/1996 | Rubenstein et al. | |
| 5,586,727 A | 12/1996 | Shekalim | |
| 5,615,838 A | 4/1997 | Eckstein et al. | |
| 5,628,462 A | 5/1997 | Miller | |
| 5,865,377 A | 2/1999 | DeFrank et al. | |
| 5,931,389 A | 8/1999 | Clavel | |
| 6,015,102 A | 1/2000 | Daigle et al. | |
| 6,027,048 A | 2/2000 | Mehoudar | |
| 6,039,270 A | 3/2000 | Dermitzakis | |
| 6,206,305 B1 | 3/2001 | Mehoudar | |
| 6,250,571 B1 | 6/2001 | Cohen | |
| 6,308,902 B1 | 10/2001 | Huntley | |
| 6,382,530 B1 | 5/2002 | Perkins | |
| 6,464,152 B1 | 10/2002 | Bolinis et al. | |
| 6,568,607 B2 | 5/2003 | Boswell et al. | |
| 6,581,854 B2 | 6/2003 | Eckstein et al. | |
| 6,945,476 B2 | 9/2005 | Giuffre | |
| 7,270,280 B2 | 9/2007 | Belford | |
| 7,648,085 B2 | 1/2010 | Mavrakis et al. | |
| 7,681,805 B2 | 3/2010 | Belford et al. | |
| 7,681,810 B2 * | 3/2010 | Keren | 239/542 |
| 2005/0284966 A1 | 12/2005 | DeFrank | |
| 2007/0175580 A1 | 8/2007 | Mata et al. | |
| 2009/0051159 A1 | 2/2009 | Cameron et al. | |
| 2009/0165879 A1 | 7/2009 | Socolsky | |
| 2010/0108785 A1 | 5/2010 | Lee | |

* cited by examiner

*Primary Examiner* — Steven J Ganey

(57) ABSTRACT

A drip irrigation emitter includes a disc shaped body having a pressure reducing labyrinth between a water inlet area and an outlet hole, and a pressure regulating diaphragm changing flow through the outlet hole in response to water pressure fluctuations in the water conduit where the emitter is mounted. The water filtering inlet of the emitter is located entirely at the sides of the disc shaped body.

13 Claims, 4 Drawing Sheets

DISC SHAPED REGULATED DRIP IRRIGATION EMITTER

FIELD OF THE INVENTION

This invention relates to drip irrigation emitters, also referred to as drippers or emitters, and more specifically to integral drip irrigation emitters that are attached the inner wall of a water conduit.

BACKGROUND OF THE INVENTION

Drip irrigation emitters are generally known for use in delivering irrigation water to a precise point at a predetermined and relatively low volume flow rate to conserve water. Drip irrigation emitters may be used in water conduits such as drip tape or extruded pipe, to supply water at a slow, controlled rate to the root zone of the plants being irrigated. The emitters may be inserted into and bonded with the water conduit wall at regular intervals. Each emitter may conduct water from the interior to the exterior of the conduit at a reduced pressure and at a lower rate.

As the water travels through the conduit away from the water source, the water pressure decreases. Water pressure at the beginning of the conduit may be greater than at the far end of the conduit. Other field conditions, such as elevation, also affect the water pressure, and thus the drip rate, along the length of the water conduit. Changes in drip rate are a problem because some areas may receive too much or too little water, and it is desirable to have a relatively uniform drip rate along the length of the water conduit. To reduce the effect of the pressure differences over the length of the conduit, some drip irrigation emitters have been developed that are pressure compensating or flow rate regulated. Pressure compensating or flow rate regulated emitters allow increasing the length of the water conduit while having substantially uniform drip rates along the conduit's length, and may cover larger areas more economically.

U.S. Pat. Nos. 6,039,270 and 7,681,805 show examples of integral flow regulated emitters that are generally disc shaped. These emitters have a relatively large thickness including three levels stacked together, and a relatively small filter area. Water from the water conduit flows through all three levels of the emitter. The first level includes a relatively small filter area facing the inside space of the conduit, along with a water entrance chamber and part of the pressure reducing path or labyrinth. The second level, which is separated from the first level by a diaphragm or elastomeric membrane, includes a continuation of the pressure reducing path or labyrinth, and a regulation chamber. The third level, which is bonded to the conduit wall, includes an exit pool adjacent an opening in the conduit wall.

It is desirable to reduce or minimize the size and thickness of integral disc shaped drip irrigation emitters. For example, reducing the size and thickness of the emitters is advantageous because it can result in savings in the cost of materials. For single use applications, in which a drip tape may be removed from the field for disposal or recycling after each growing season, it would be advantageous and desirable to have emitters that are lower in cost.

Additionally, reducing the size and thickness of the emitters also would help in packaging and shipping. After the water conduit has integrated emitters in place, it is a common procedure to roll the drip line for packaging and shipping. However, each emitter has a thickness that may cause a bulge or lump that increases the difficulty of rolling and packaging the conduit, especially with thin walled drip tape, e.g., 15 mil or less. A drip irrigation emitter is needed having reduced size and thickness to facilitate packaging and shipping of thin walled drip tape or conduit.

There also is a need for a disc shaped drip irrigation emitter that reduces or minimizes the cost and size of the diaphragm, or elastomeric membrane, used for pressure regulation. The diaphragm is an elastomeric element that must flex in accordance with the water pressure differential on both sides of the diaphragm. The elastomer material may be rather costly, and attempts to replace the elastomeric element with other less costly materials have not been successful because other materials are not sufficiently flexible over time due to compression set of the material, and as a result may decrease the flow rate to an unacceptable rate.

Additionally, there is a need for a drip irrigation emitter that has a relatively large filtering area to provide a sufficient volume of water into the emitter. In drip irrigation systems, it is important to filter debris or other matter to prevent it from blocking or restricting flow through the emitter pressure reducing flow passage and outlet. However, it is increasingly difficult to provide a large filtering area if the emitter is reduced in size. A disc shaped pressure regulated emitter is needed having a large filtering area and a very small thickness.

SUMMARY OF THE INVENTION

The drip irrigation emitter is disc shaped and has a first face bonded to a water conduit wall, a second face having an opening exposed to the water pressure in the conduit, and a plurality of filtering slots in a side surface between the first face and the second face. A labyrinth connects between the filtering slots and an outlet hole. A pressure or flow regulating diaphragm in the emitter flexes in response to water pressure fluctuations in the conduit, providing for a substantially constant flow rate from the emitter.

The sides of the drip irrigation emitter provide a large filtering area to provide a sufficient volume of water flowing into the emitter, despite the emitter's small size. The emitter's small size and thickness make it sufficiently low in cost for single use applications, make it useful when packaging and shipping thin walled water conduits such as drip tape, and minimize the cost and size of the pressure regulating diaphragm.

DESCRIPTION OF THE PREFERRED EMBODIMENT

Figure 1:
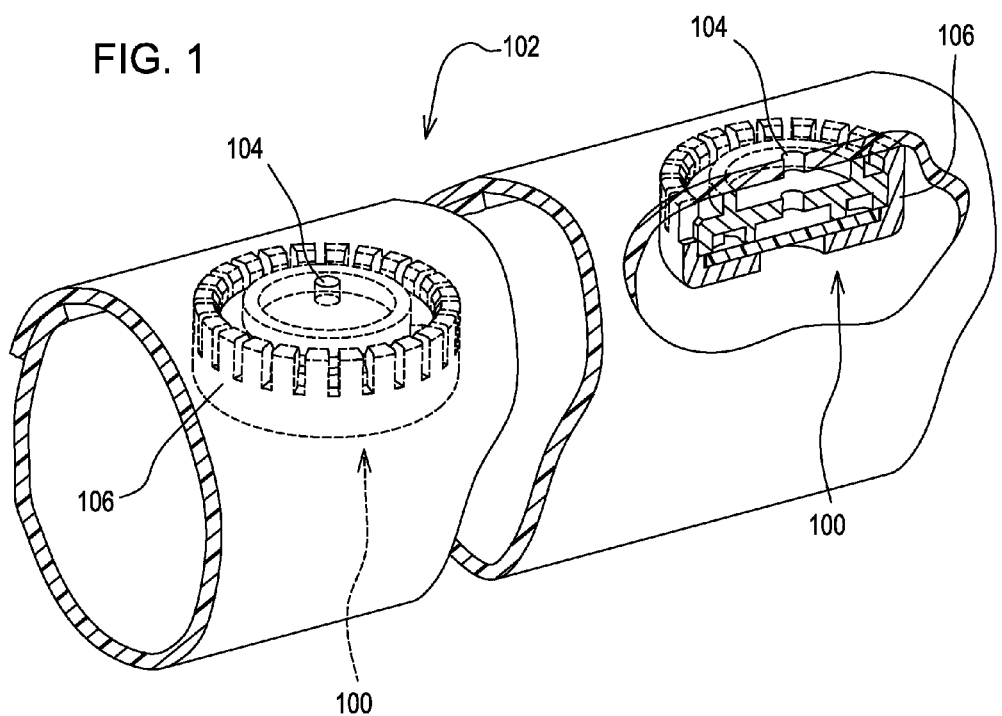
FIG. 1 is a partial cross section view of a water conduit in which emitters in accordance with a preferred embodiment of the invention are mounted.
Figure 2:
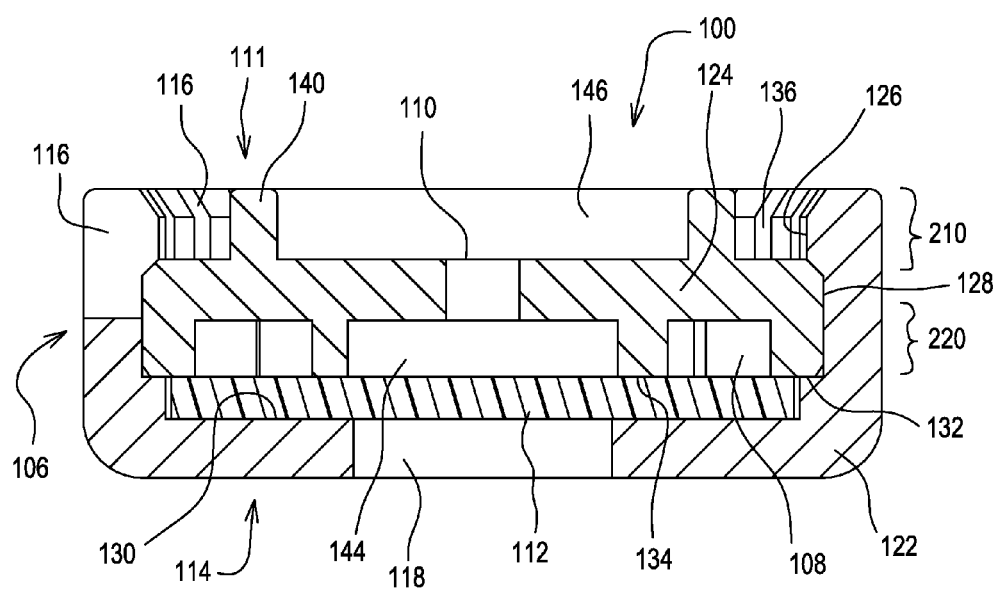
FIG. 2 is a cross section view of drip irrigation emitter in accordance with a preferred embodiment of the invention.
Figure 3:
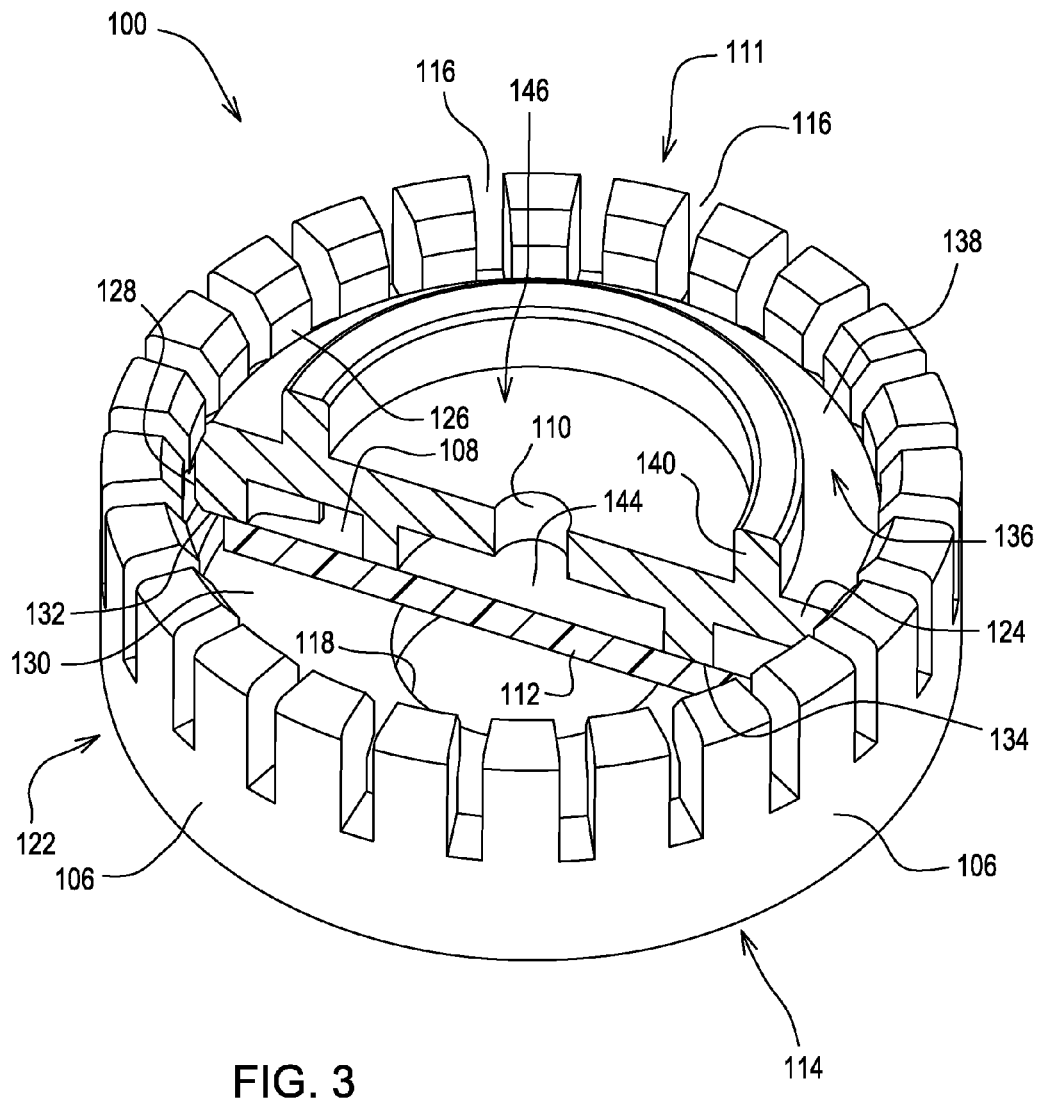
FIG. 3 is a cross section view in perspective of a drip irrigation emitter according to a preferred embodiment of the invention.
Figure 4:
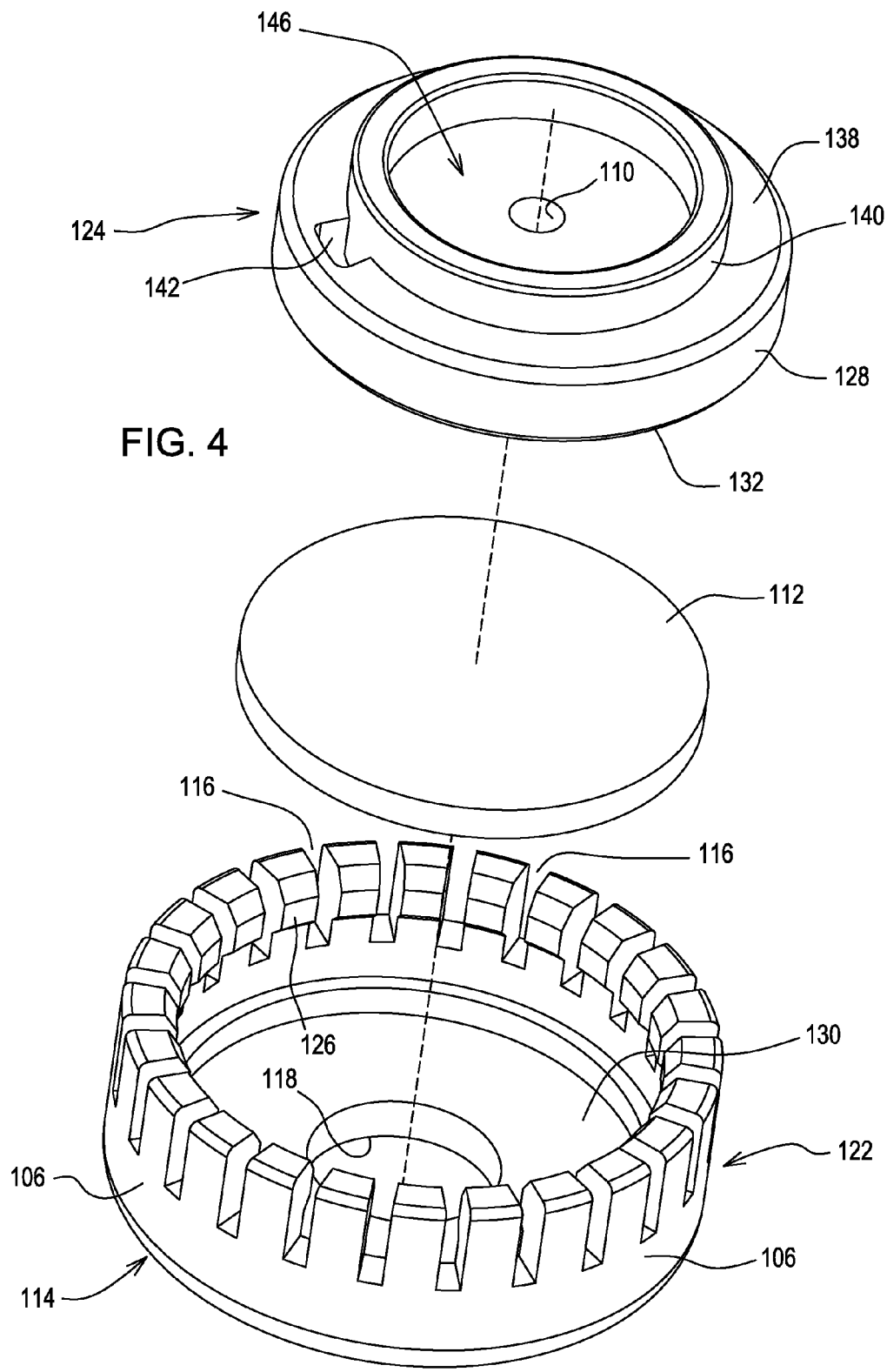
FIG. 4 is an exploded top perspective view of a drip irrigation emitter according to a preferred embodiment of the invention.
Figure 5:
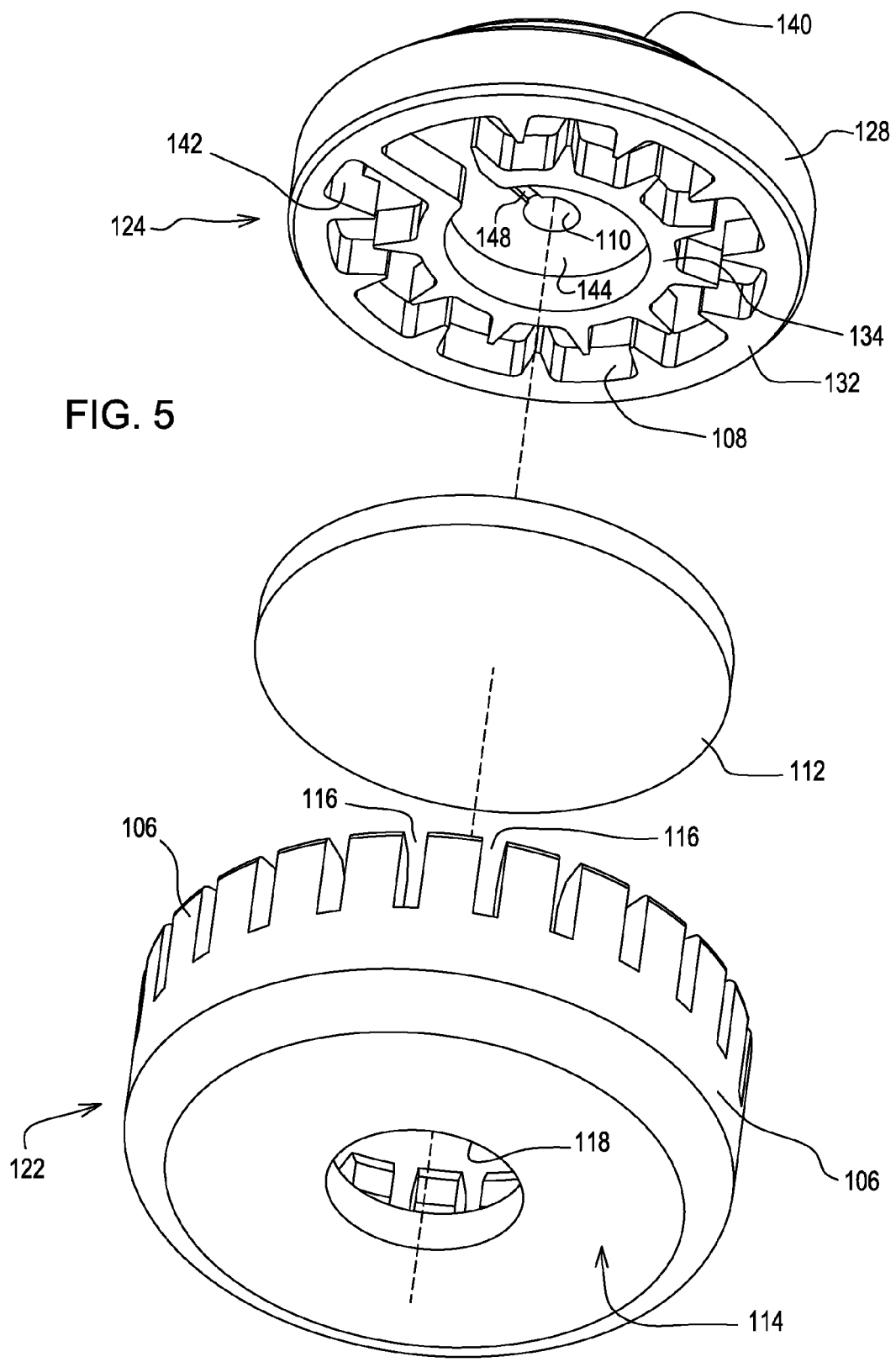
FIG. 5 is an exploded bottom perspective view of a drip irrigation emitter according to a preferred embodiment of the invention.

As shown in FIGS. 1-5, drip irrigation emitter 100 is a pressure regulated drip emitter of small size, preferably having a diameter of less than about 10 mm, and a thickness of less than about 5 mm, and most preferably less than about 3.5 mm. The emitter may be a molded plastic body that may be inserted into thin walled drip tape 102, or any other type of water conduit such as an extruded hose, at regularly spaced intervals during or immediately following extrusion of the drip tape. Each drip irrigation emitter may have a single outlet that may be positioned at an opening 104 that is cut or preformed in the wall of the drip tape during production. The emitter is sufficiently low in cost so that it is advantageous for single use applications in which the drip tape may be removed from the field for disposal or recycling after each growing season.

In the embodiment of FIGS. 1-5, water in thin walled drip tape 102 may enter the emitter by passing through a filter at the emitter's sides or perimeter 106. Because the filter area is in the emitter's sides or perimeter, the emitter can provide a filter of large area relative to the size or thickness of the emitter. For example, the emitter in a preferred embodiment may have a thickness of about 3.5 mm, and a filter area of at least about 12 mm².

In one embodiment, filtered water then passes through labyrinth 108 where water pressure is reduced. For example, water pressure may be reduced from the line pressure in the drip tape (e.g., 12 psi) to a substantially lower pressure. Water at the reduced pressure then may flow through outlet hole 110 near the emitter's first or outer face 111 welded or adhered to the drip tape wall.

In one embodiment, the emitter is pressure regulated using diaphragm 112 at or adjacent the emitter's second or inner face 114. Water pressure in the drip tape acts against the diaphragm to regulate the emitter's flow rate as water pressure changes within the water conduit.

Now referring in more detail to the embodiment of FIGS. 1-5, the emitter may include three parts, two body members 122 and 124, and elastomeric diaphragm 112. The emitter's first or outer face 111 may have one or more walls or surfaces that are welded, adhered to or otherwise bonded to the drip tape inner wall. The emitter has a second or inner face 114 that may project inwardly toward the interior of the drip tape. The thickness of the emitter between the first or outer face and the second or inner face is preferably less than about 5 mm, and most preferably less than about 3.5 mm. The filter area of the emitter is entirely on the sides 106 or periphery of the emitter, between the emitter's outer face 111 and inner face 114.

In one embodiment, the filter area may be configured as a plurality of slots 116 through the sides of the emitter which provide filtering inlets or passages for water in the drip tape to enter into the emitter. Each slot 116 through the emitter's side walls may have dimensions that are small enough to block particles or debris from passing through the slot to the interior of the emitter, while allowing a desired flow rate of water from the drip line into the interior of the emitter.

For example, in one embodiment, the emitter may be generally disc shaped, and each slot 116 may extend radially through the emitter's cylindrical side walls 106, from the perimeter or outer surface to the interior of the emitter. In the embodiment of FIGS. 1-5, emitter 100 may have 24 radial slots, each slot having a width of less than about 0.5 mm, and most preferably having a width of less than about 0.3 mm. The radial thickness of the emitter's side walls may be between about 0.5 mm and about 1.0 mm. The emitter's radius may be between about 3.5 mm and about 6.5 mm, and the emitter's outer circumference may be between about 10 mm and about 30 mm.

In one embodiment, the second or inner face 114 of the emitter may have an opening 118. Diaphragm 112 may be an elastic bladder that is positioned between body members 122 and 124, while the diaphragm is directly exposed on one side to the water pressure within the drip tape or other water conduit where the emitter is mounted.

For example, the diaphragm may have a thickness of about 0.5 mm to about 0.75 mm, and a surface which is large enough to cover both pressure regulating chamber 144 and labyrinth 108 which is formed in second body member 124 on surface 132.

In one embodiment, the diaphragm may be exposed to line pressure in the drip tape which may enter through opening 118 and directly act against the diaphragm, causing the diaphragm to flex as the water pressure at the diaphragm on the other side is decreased. If water pressure in the drip tape increases, the diaphragm may flex radially toward outlet 110 and away from the emitter's second or inner face, reducing the outlet flow from the emitter.

In one embodiment, water acting against the diaphragm while passing through opening 118 does not also pass through a filter. Instead, the filter may be an array of slots 116 in the emitter's cylindrical side walls 106, and are dedicated only for water entering the emitter's pressure reducing area, or labyrinth 108.

In one embodiment, diaphragm 112 may be held in place by sandwiching outer portions of the diaphragm between first body member 122 and second body member 124 of the emitter. The first and second body members may be engaged together with a snap or press fit. For example, the second member may be inserted into the first member, and may be held in place by shoulders 126 that extend inwardly from the emitter's side walls 106. The inwardly facing shoulders may capture and hold the second member in place because the dimensions of the second member's outer rim or perimeter 128 may be slightly larger than the dimensions of shoulders 126. Diaphragm 112 may be held between surface 130 of the first member and one or more walls 132, 134 of the second member. Optionally, the shoulders and outer rim or perimeter may be tapered to facilitate ease of assembly. Additionally, portions of the diaphragm that are radially outside of opening 118 may be compressed axially by a tight or sealing interfit between the first and second body members.

In one embodiment, water entering the emitter through the filter area in the emitter's sides may be collected in manifold flow channel 136 inside the filter area. For example, the manifold flow channel may be a passage radially within the filter area on the emitter's side walls 106, and may be enclosed by the drip tape wall, surface 138, and wall 140 that circumscribe exit pool 146.

In one embodiment, flow path inlet 142 may provide a passage from manifold flow channel 136 to labyrinth 108. For example, the flow path inlet may be an opening through the emitter's second member adjacent its outer rim or perimeter 128. Labyrinth 108 may be a circuitous passage having a number of baffles that restrict water flow through the emitter to reduce water pressure. For example, the labyrinth may be a passage molded into the second member near its outer rim or perimeter, between walls 132 and 134. The labyrinth may extend from flow path inlet 138 to regulation chamber 144.

In one embodiment, water from regulation chamber 144 may flow through outlet hole 110 to exit pool 146. Exit pool 146 may be surrounded by wall 140 and may be positioned directly on an opening through the drip tape wall. Diaphragm 112 may flex into or away from the regulation chamber to restrict or open flow through outlet hole 110 and assure the outlet flow rate does not vary significantly with changes in water pressure in the drip tape. For example, if water pressure in the drip tape increases, the diaphragm may flex toward the outlet hole to limit the outlet flow. If water pressure in the drip tape decreases, the diaphragm may flex away from the outlet hole to maximize outlet flow. Additionally, trickle channel 148 may be provided at the edge of the outlet hole to prevent possible blockages.

In one embodiment, the disc shaped regulated emitter is very thin because it includes only two levels through which water flows from the water conduit. The first level 210 includes the circumferential filtering array, such as plurality of slots 116, manifold flow channel 136, and exit pool 146. The second level includes the pressure reducing area or labyrinth 108, and regulating chamber 144. Water entering the emitter flows from the first level to the second level through flow path inlet 142, and back from the second level to the first level via outlet hole 110.

Having described the preferred embodiment, it will become apparent that various modifications can be made without departing from the scope of the invention as defined in the accompanying claims.

The invention claimed is:

1. A drip irrigation emitter, comprising:
a plastic body having a first face bondable to a water conduit inner wall and a second face inside the conduit including an opening exposed to water pressure in the conduit;
a diaphragm that flexes in response to water pressure fluctuations in the conduit; and
a filter area at the sides of the plastic body between the first face and the second face;
wherein the diaphragm is sandwiched between a first body member and a second body member of the plastic body.

2. The drip irrigation emitter of claim 1 wherein the drip irrigation emitter is disc shaped.

3. The drip irrigation emitter of claim 1 wherein the filter area is an array consisting of a plurality of slots through the sides of the plastic body.

4. The drip irrigation emitter of claim 1 further comprising a labyrinth extending through the plastic body between the filter area and an outlet adjacent the first face.

5. A water conduit having at least one of the drip irrigation emitters of claim 1 mounted to the water conduit inner wall.

6. The water conduit of claim 5 further comprising a plurality of drip irrigation emitters mounted to the water conduit inner wall.

7. A drip irrigation emitter, comprising:
a disc shaped body having a pressure reducing labyrinth between a water filtering inlet and an outlet hole;
a pressure regulating diaphragm keeping constant flow through the outlet hole in response to water pressure fluctuations;
the water filtering inlet located entirely in the sides of the disc shaped body;
wherein the pressure regulating diaphragm is held between a first body member and a second body member of the disc shaped body.

8. The drip irrigation emitter of claim 7 wherein the second body member fits into the first body member.

9. The drip irrigation emitter of claim 7 wherein a labyrinth is molded into the second body member.

10. The drip irrigation emitter of claim 7, wherein the drip irrigation emitter being mountable to an inner wall of a water conduit.

11. A drip irrigation emitter, comprising:
a first body member having a first face bondable to a water conduit wall, a second face having an opening, and a plurality of filtering slots in a side surface between the first face and the second face;
a second body member inserted into and held by the first body member and having a labyrinth molded into a surface thereof, the labyrinth connecting between the filtering slots and an outlet hole; and
a diaphragm captured between the first body member and the second member and flexing in response to water pressure fluctuations in the water conduit to regulate the flow of water through the outlet hole.

12. The drip irrigation emitter of claim 11 wherein the first body member and the second body member each are disc shaped.

13. The drip irrigation emitter of claim 11 wherein the second body member includes a wall between the filtering slots and the outlet hole.

* * * * *